March 19, 1968 D. M. CHAPIN 3,374,317

TELEPHONE SIGNALING SYSTEM

Original Filed March 12, 1964 2 Sheets-Sheet 1

INVENTOR
D. M. CHAPIN
BY R.O. Nimz
ATTORNEY

March 19, 1968 D. M. CHAPIN 3,374,317

TELEPHONE SIGNALING SYSTEM

Original Filed March 12, 1964 2 Sheets-Sheet 2

United States Patent Office 3,374,317

Patented Mar. 19, 1968

3,374,317

TELEPHONE SIGNALING SYSTEM

Daryl M. Chapin, Basking Ridge, N.J., assignor to Bell Telephone Laboratories, Incorporated, New York, N.Y., a corporation of New York Original application Mar. 12, 1964, Ser. No. 351,353, now Patent No. 3,322,903, dated May 30, 1967. Divided and this application Dec. 28, 1966, Ser. No. 623,153

5 Claims. (Cl. 179—84)

ABSTRACT OF THE DISCLOSURE

A "called-when-you-were-out" indicator for subscriber telephone is disclosed which detects the ringing signal by breaking down a gas tube in response to the increased peak voltage. The tube sustains conduction with the normal line voltage and can be made to flash or to hold a steady on signal until manually reset. Once it has been broken down, the indicator continues to give either a continuous or a flashing signal until it is manually reset by the subscriber.

This is a division of application Ser. No. 351,353 filed Mar. 12, 1964 now Patent No. 3,322,903.

This invention relates to signal detector circuits and, more particularly, to detectors and indicators for telephone ringing signals.

It is often desirable to indicate that a telephone has been rung in the absence of the subscriber. Detectors for monitoring telephone ringing signals and tripping an indicating device have therefore been developed for this purpose. Such arrangements, however, are usually cumbersome, expensive and require extensive maintenance.

It is an object of the present invention to detect telephone ringing signals with simple, inexpensive arrangements which can be mounted directly in a telephone set housing.

Heretofore proposed ringing signal detectors, moreover, have required external sources of power for their operation and have usually involved exposed mechanical parts subject to damage and misadjustment.

A further object of this invention is to detect telephone ringing signals with an electrical circuit requiring little or no power other than that supplied by the telephone line itself.

It has been a common practice for individuals desiring complete telephone coverage to subscribe to a telephone answering service. The telephone answering service line is sometimes bridged directly on the customer's line, or a separate telephone answering service number is included in the customer's telephone listing and advertising.

Such answering services solve many of the problems of subscribers who require substantially constant supervision of their telephone calls. Such answering services, however, are usually limited to taking messages or forwarding brief instructions. The major business activities of the subscriber must still be carried on by the subscriber himself. Hence, the calls made to his phone in his absence must be reported to him for his action. Thus, the subscriber must call his answering service each time he returns to his telephone after an absence, or the telephone answering service must continue to make attempts to reach the subscriber until he returns and can be given any messages. In either event, time is wasted and the telephone facilities are used unnecessarily.

It is yet another object of the invention to signal a subscriber in his absence over the regular telephone line.

It is a more specific object of the invention to detect a prearranged number of rings at an unattended telephone set and to indicate the reception of such a prearranged signal.

In accordance with the present invention, a diode detector for ringing signals is bridged directly across the subscriber's telephone line. A neon lamp is selected which ignites when a ringing signal is detected, but which sustains conduction with only the normal telephone line voltage. A reset circuit allows the subscriber to extinguish the lamp by the depression of a suitable reset button.

Circuits such as that described above respond to telephone ringing signals of any length and hence can be used only to indicate that someone has called. In order to detect a code ring of prearranged length, in accordance with the present invention, the detector circuit includes a time-out circuit and a counter circuit. The time-out circuit is arranged to provide a signal after a fixed interval following the termination of ringing signals. The counter circuit keeps track of the number of rings received. If the number of rings is equal to but not greater than the prearranged number after the time-out interval, an indicating circuit is tripped to provide an indication thereof.

A feature of the invention is an oscillator circuit energized from the telephone line, the output of which is rectified to supply the required voltage for the indicating circuit.

The major advantages of the present invention over heretofore proposed arrangements reside in its compact size, ability to operate without external sources of power, and ability to transfer information with no direct signaling path.

These and other objects and features, the nature of the present invention and its various advantages, will be more fully understood upon consideration of the attached drawings and of the following detailed description of the drawings.

Figure 1:
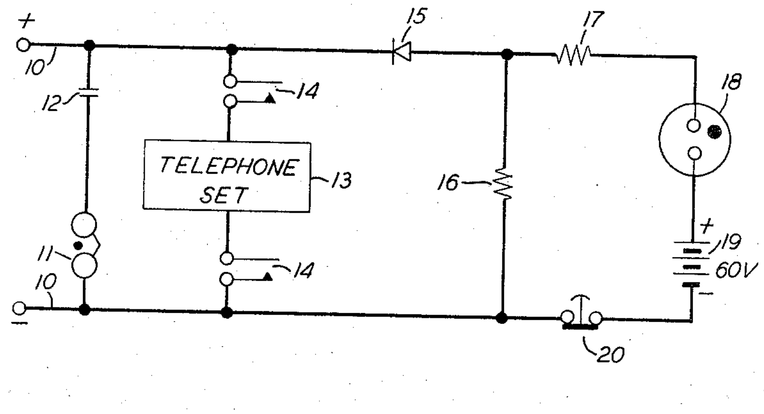
FIG. 1 is a circuit diagram of a ringing signal detector circuit providing a steady lamp indicating signal.

Referring more particularly to FIG. 1, there is shown a detailed circuit diagram of a telephone ringing signal detection circuit comprising a two-wire telephone line 10 across which is bridged a conventional telephone bell 11 in series with coupling capacitor 12. Also bridged across line 10 is a telephone set 13 which is connected to line 10 by normally-open switchhook contacts 14.

In accordance with the present invention, a ringing signal detector comprising rectifier diode 15, resistors 16 and 17, neon lamp 18, and battery 19 is also connected across line 10. Rectifier 15 is poled so as to oppose current flow due to the normal line voltage on line 10. As can be seen in FIG. 1, this voltage is normally positive at the top line and negative at the bottom line.

During the negative cycles of a conventional 20 cycle ringing signal having a peak-to-peak voltage of about 230 volts, diode 15 becomes forward biased, and this voltage, added in series with the voltage of battery 19, is sufficient to ignite neon lamp 18, causing the lamp to glow as an indication that the telephone set has been rung. The voltage of battery 19 is sufficient to sustain conduction through neon lamp 18, although not adequate for ignition. Thus, when the ringing signals terminate on line 10, lamp 18 continues to glow under the control of battery 19. The reset button 20 is provided to open the circuit and extinguish lamp 18 whenever depressed.

The circuit of FIG. 1 has the advantages of presenting a very high impedance, equal to the reverse impedance of diode 15, when not in use. Moreover, all of the current required for this indicating circuit is derived from battery 19 and virtually no current is drawn from line 10. Normally closed switch 20, however, must be depressed to extinguish the lamp and return indicating circuit to normal.

It can be seen that the indicating circuit of FIG. 1 can be easily constructed to fit directly into the telephone set which it is monitoring. Moreover, all the circuit elements used are simple, rugged, inexpensive components, and hence the circuit itself is inexpensive to construct and easy to maintain.

Figure 2:
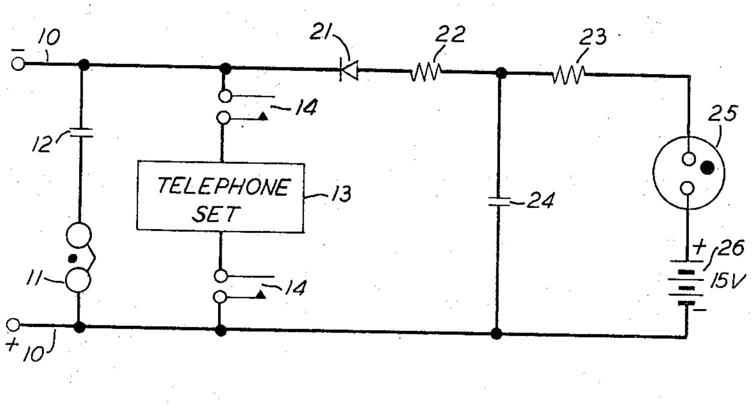
FIG. 2 is a circuit diagram of an alternative ringing signal detector circuit providing a steady lamp indicating signal.

In FIG. 2 there is shown a schematic diagram of another circuit which may be used to indicate that the telephone has been rung. The circuit of FIG. 2 comprises a telephone line 10 across which is bridged a telephone bell 11 in series with coupling capacitor 12. Also bridged across line 10 is a telephone set 13 connected by the normally-open switchhook contacts 14. The same reference numerals have been used in FIG. 2 to identify components identical to those in FIG. 1.

The detector circuit in FIG. 2 comprises a rectifier diode 21, resistors 22 and 23, capacitor 24, lamp 25 and battery 26. Diode 21 is poled for easy conduction in the direction of the normal line voltage on telephone line 10. This line voltage, when added to the voltage of battery 26, is not sufficient to ignite lamp 25. In the presence of a ringing signal at line 10, however, this voltage rises to a value sufficient to ignite neon lamp 25. Capacitor 24 sustains this voltage when diode 21 becomes reverse-biased by the swings of the ringing voltage in the opposite direction.

When the ringing signal ceases, the normal line voltage plus the voltage of battery 26 are sufficient to sustain conduction in lamp 25. When the telephone is picked up and switchhook contacts 14 are closed, the resulting current flow through telephone set 13 causes the voltage on line 10 to drop somewhat. This voltage drop is sufficient to extinguish lamp 25. Thus, the reset of the indicating circuit of FIG. 2 is automatic.

The circuit of FIG. 2 draws so little current from battery 26 that the estimated expected life of this battery tends to exceed its normal shelf life. Moreover, the detector circuit of FIG. 2 has a stand-by impedance which approaches infinity at direct current and which exceeds 100,000 ohms at all voice frequencies. Capacitor 24 and resistor 22 tend to filter out inductive voltage transients which might otherwise ignite lamp 25 when switchhook contacts 14 are reopened.

Figure 3:
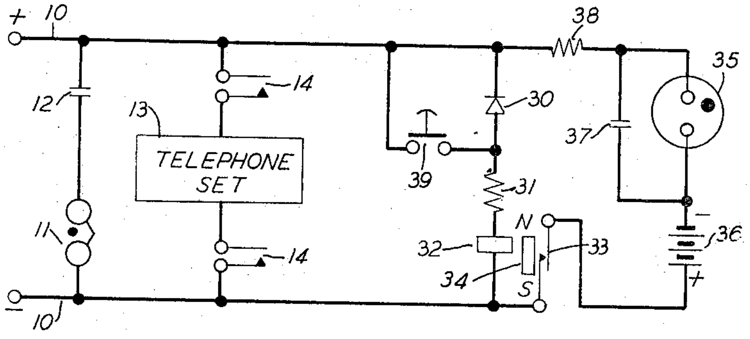
FIG. 3 is a circuit diagram of a ringing signal detector circuit providing a flashing lamp indicating signal and drawing no power from the telephone line.

In FIG. 3 there is shown a circuit diagram of yet another ringing signal detection circuit comprising a conventional telephone line 10 across which is bridged a telephone bell 11 in series with coupling capacitor 12. Also bridged on line 10 is a telephone set 13 connected by normally-opened switchhook contacts 14.

Also bridged on telephone line 10 is a detection circuit comprising, in series, a rectifier diode 30, a resistor 31 and the operating coil 32 of a small glass enclosed ("Ellwood type") relay. When energized, coil 32 operates contacts 33 which are held closed by a small sintered Alnico II holding magnet 34.

When contacts 33 are closed, neon lamp 35 is connected in series with battery 36 and resistor 38 across line 10. The line voltage, in combination with the voltage of battery 36, is sufficient to ignite neon lamp 35. Thus, when capacitor 37 is charged to the full line voltage, neon lamp 35 ignites, rapidly discharging capacitor 37. When the voltage on capacitor 37 drops sufficiently low, neon lamp 35 is extinguished and the voltage on capacitor 37 is allowed to again build up to the firing voltage of lamp 35. Thus, capacitor 37 and resistor 38, in combination, form a flasher circuit for lamp 35. Since a flashing lamp is much more noticeable than a steady lamp, such a flashing arrangement is to be preferred. Moreover, less current is used to flash lamp 35 than to sustain conduction therein.

A normally-opened pushbutton switch 39 is provided to reset the indicating circuit. When depressed, pushbutton switch 39 applies the line voltage on line 10 directly to coil 32. This voltage is of such a polarity as to generate a field which neutralizes the magnetic latch magnet 34 and thus releases contacts 33.

The heretofore described ringing detection circuits are extremely useful for indicating that an unattended telephone set has been rung. In many cases, however, the mere fact that a telephone has been rung is inadequate information for many types of telephone service. Thus, if the subscriber has provided an answering service to answer his phone in his absence, he cannot be certain that the call which has tripped his indicator lamp was of sufficient importance to warrant a call to his answering service. A more useful indication would be one under the control of an answering service so that an indication is given to the subscriber only when a call to the answering service is desirable. In most types of answering service, however, there is no direct connection between the subscriber and his answering service on which such signaling can take place.

Figure 4:
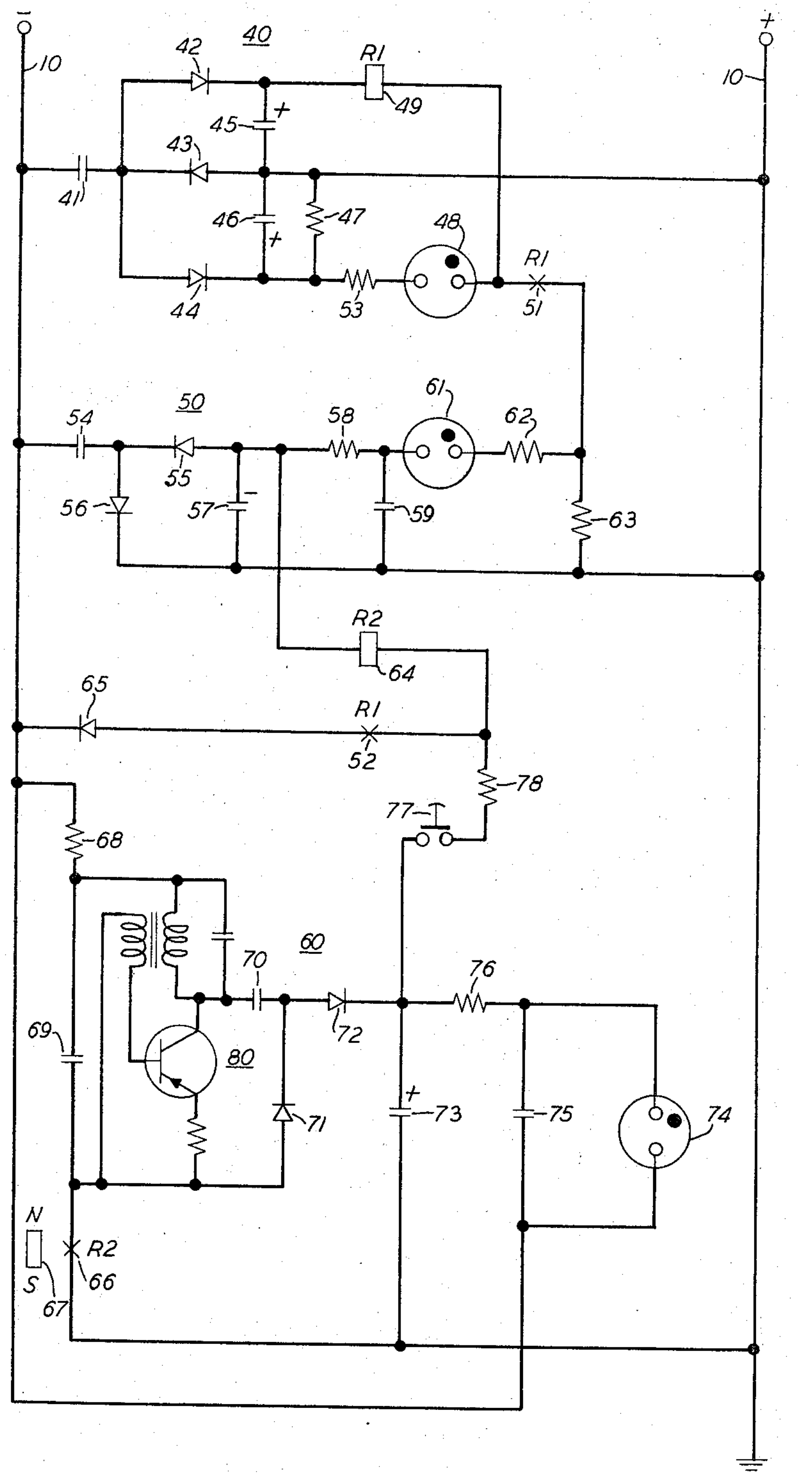
FIG. 4 is a circuit diagram of a ringing signal detector circuit responsive to a prearranged number of ringing signals, providing a flashing lamp indicating signal, and utilizing no auxiliary power sources.

The circuit of FIG. 4 shows one circuit arrangement which can be used for signaling a subscriber in his absence with no direct connection between the signaling station and the subscriber station. Under these conditions, the only thing which can be controlled by the calling party is the number of rings which are generated prior to hang-up. In accordance with the present invention, this number can be selected and the circuit arranged to provide indication when this number, and only this number, of rings are received.

Referring more particularly to FIG. 4 there is shown a circuit diagram of a detector circuit responsive to a preselected number of telephone rings. The circuit of FIG. 4 comprises three basic subcircuits, a time delay circuit 40, a counter circuit 50 and an indicator circuit 60.

The time delay circuit 40 comprises an input capacitor 41, diodes 42, 43, and 44, and capacitors 45 and 46. Capacitor 41, diodes 42 and 43 and capacitor 45 together comprise a conventional voltage rectifier and doubler circuit. A ringing current applied to telephone line 10 therefore charges capacitor 45 to approximately 230 volts (the peak-to-peak voltage of conventional 20 cycle ringing signals). Similarly, capacitor 41, diodes 43 and 44 and capacitor 46 together comprise a second voltage rectifier and doubler circuit. Capacitor 46, therefore, is likewise charged to the peak-to-peak voltage of the ringing signal. A bleeder resistor 47, however, is connected across capacitor 46 to discharge this capacitor at a controlled rate.

Each burst of ringing current or reasonable fraction thereof charges both of capacitors 45 and 46 to the full 230 volts. The charge on capacitor 46 tends to discharge by way of resistor 47 and thus reduce the voltage on capacitor 46. Each new burst of ringing current, however, restores the voltage on capacitor 46 to 230 volts.

After ringing signals have ceased, the voltage on capacitor 46 continues to decay until, after some fixed time interval, the difference in voltages on capacitors 45 and 46 is sufficient to ignite neon lamp 48. This interval may be adjusted to about six seconds to insure that no additional ringing signal bursts will be received. When lamp 48 ignites, the current drawn therethrough operates relay 49 to close normally-open contacts 51 and 52. Resistor 53 limits the current drawn through neon lamp 48. It can be seen that relay 49 operates at the time at which a decision must be made as to how many ringing bursts have been received.

Referring now to the counter circuit 50, capacitor 54, diodes 55 and 56 and capacitor 57 likewise are arranged to form a voltage rectifier and doubler circuit. Capacitor 57 is connected by way of resistor 58 to capacitor 59. Capacitor 59 is, in turn, connected by way of neon lamp 61 and resistor 62 to contacts 51. A second relay coil 64 is connected from capacitor 57 through contacts 52 and diode 65 to the negative side of line 10.

It can be seen that, with proper values, the voltage accumulated on capacitor 57 can be made proportional to the number of cycles of ringing current received over line 10. The charge on capacitor 57 tends to leak to capacitor 59 through resistor 58 and thus maintain capacitors 57 and 59 at the same voltage. The larger the number of spurts of telephone ringing current received, the higher will be the voltage on capacitor 57.

After ringing signals have terminated and the six second time-out occurs, as indicated by the operation of relay 49, relay contacts 52 close to connect relay coil 64 between capacitor 57 and the negative side of line 10. If the appropriate number of bursts of ringing current have been received, the voltage difference between capacitor 57 and the negative side of line 10 is sufficient to operate relay 64. When a different number of cycles of ringing current have been received, relay 64 will not operate. This can be arranged in many different ways. One particular circuit arrangement is described below.

A code signal of a single ring, for example, has many advantages over other codes. This can be seen when it is realized that the normal calling party almost never hangs up after a single ring. Moreover, this allows the calling party, who is to give the coded ring, less difficulty in counting and permits him rapidly to retire from the line. In this way, the central office telephone equipment is tied up for a minimum length of time.

Returning again to FIG. 4, it can be seen that diodes 55 and 56 are poled such that telephone ringing signals therefore tend to charge capacitor 57 in a negative direction as shown. A single ring, in the illustrative embodiment can be arranged to charge capacitor 57 to approximately 25 volts. If only a single ring occurs and contacts 52 thereafter close, the difference between the 25 volts on capacitor 57 and the 48 volts on the negative side of line 10 causes sufficient current to flow through relay coil 64 to operate this relay. If, however, two or more bursts of ringing signals have been received, the voltage on capacitor 57 is approximately fifty or more volts and exceeds the line voltage on line 10 and diode 65 remains nonconducting. Under these conditions, relay coil 64 does not operate.

Although the operation of the circuit of FIG. 4 has been described in connection with a one ring code, it is clear that circuit arrangements could be easily devised to detect any particular desired number of telephone rings. Because of the many advantages of using a single ring, however, this code is usually to be preferred over all other possible codes.

In order to return capacitor 57 to its initial voltage condition in a rapid fashion, resistor 63 is connected to neon lamp 48 when relay 49 closes contacts 51. The positive voltage developed across resistor 63 at this time breaks down neon lamp 61 and places a positive charge on capacitor 59. Due to the large value of resistor 58, the voltage on capacitor 59 does not affect the comparison with the voltage on capacitor 57. After the decision has been made, however, the voltage in capacitor 59 leaks to capacitor 57 to restore this capacitor to its discharged state.

A further advantage of neon lamp 61 can be seen if it is considered what might occur when a very large number of telephone rings are allowed to take place before a calling party hangs up. The voltage on capacitors 57 and 59 would tend to build up to very large values. Before these large values are reached, however, lamp 61 ignites to partially discharge these capacitors. The time constants are arranged such that the charge on capacitor 57 never falls to a value which might operate relay coil 64.

When operated, relay 64 operates contacts 66 which latch magnetically by means of a latching magnet 67. When closed, contacts 66 connect oscillator circuit 80 across telephone line 10 by way of resistor 68 and capacitor 69. The latter two components protect transistor of oscillator 80 from ringing current transients. The oscillator circuit 80 is a conventional inductor-capacitor-tuned, feedback oscillator energized from the telephone line and arranged to oscillate at any suitable frequency. The output of oscillator 80 is rectified and doubled by way of the voltage doubler comprising capacitors 70 and 73 and diodes 71 and 72. This doubler provides a direct current voltage on capacitor 75 which is of sufficient magnitude to ignite neon lamp 74. When thus ignited, lamp 74 discharges capacitor 75 to reduce its electrode voltage below the sustaining level. Lamp 74 then extinguishes and remains extinguished until the voltage on capacitor 75 again builds up to a level sufficient to again ignite neon lamp 74. Thus, resistor 76, capacitor 75 and lamp 74 form a flasher circuit which can be used to signal the subscriber when he returns to his telephone.

It can be seen that the oscillator 80 in FIG. 4, together with the rectifier-doubler circuit, makes all local battery supplies unnecessary, the circuit of FIG. 4 being energized entirely from the telephone line; a battery, of course, could be substituted for oscillator 80 in a manner similar to that shown in FIGS. 1 through 3.

If it is desired to reset the flashing lamp signal, pushbutton 77 is depressed to apply a positive voltage from capacitor 73 to the coil of relay 64. This voltage is of a polarity such that the field generated by coil 64 neutralizes the latching field of magnet 67 and relay contacts 66 release. The circuit is now returned to normal and can be used for subsequent signaling operations.

If the subscriber is present when the telephone rings and removes the handset from the switchhook after one ring, the indicator circuit is not triggered due to the drop in line voltage which accompanies the offhook condition. This reduced line voltage leaves an inadequate voltage difference across relay coil 64 to operate this relay.

The above-described circuit arrangement has the distinct advantages of permitting signaling to be carried on from a telephone answering service to a subscriber over a normal telephone circuit already available. Absolutely no additional sending equipment is required. The circuit of FIG. 4, moreover, can be constructed in a sufficiently small package to be mounted directly in the base of a conventional telephone desk set housing.

The above-described arrangements are merely illustrative of the numerous and varied other arrangements which could constitute applications of the principles of the invention. Such other arrangements may readily be devised by those skilled in the art without departing from the spirit or scope of this invention.

What is claimed is:

1. A ringing signal detector for telephone lines comprising a telephone line having a normal direct current voltage thereon, a voltage responsive indicating device, and unilateral conducting means connecting said device to said telephone line, said device having a threshold response level which is not exceeded for the polarity of said unilateral conducting means by said normal direct current voltage, but which is exceeded for the polarity of said unilateral conducting means by said normal direct current voltage, but which is exceeded for the polarity of said unilateral conducting means by said ringing signals superimposed on said normal direct current voltage, said indicating device remaining in the indicating condition established when said threshold is exceeded even after said ringing signals terminate.

2. The ringing signal detector according to claim 1 further including reset means for returning said indicating device to normal.

3. A ringing signal detector for telephone lines comprising a telephone line having a normal direct current voltage thereon, a current responsive switching means, a unilateral conducting means connecting said switching means to said telephone line, said switching means having an operating point which is not exceeded for the polarity of said unilateral conducting means by said normal direct-current voltage, but which is exceeded for the polarity of said unilateral conducting means by ringing signals superimposed on said normal direct-current voltage, said switching means remaining in its operated condition when said operating point has been exceeded even after said ringing signals terminate, and a voltage responsive indicating device whose threshold is exceeded by a potential applied to it by said switching means when said means is in said operated condition.

4. The ringing signal detector according to claim 3 wherein said indicating device includes means for generating an intermittent flashing signal.

5. The ringing signal detector according to claim 3 further comprising a reset means for returning said indicating device to normal.

References Cited

UNITED STATES PATENTS

| | | | |
|---|---|---|---|
| 2,813,154 | 11/1957 | Rabinow | 179—84 |
| 2,884,491 | 4/1959 | Breen | 179—84 |
| 3,320,368 | 5/1967 | Applebaum | 179—84 |

KATHLEEN H. CLAFFY, *Primary Examiner.*

H. ZELLER, *Assistant Examiner.*